A. P. GUSTAFSON.
MOLDING APPARATUS.
APPLICATION FILED MAY 14, 1917.

1,243,660.

Patented Oct. 16, 1917.

Witness:
John Enders

Inventor:
Axel P. Gustafson,
by Robert Burns
Atty.

UNITED STATES PATENT OFFICE.

AXEL P. GUSTAFSON, OF WAUKEGAN, ILLINOIS, ASSIGNOR TO CHICAGO HARDWARE FOUNDRY COMPANY, OF NORTH CHICAGO, ILLINOIS, A CORPORATION OF ILLINOIS.

MOLDING APPARATUS.

1,243,660.  Specification of Letters Patent.  Patented Oct. 16, 1917.

Application filed May 14, 1917. Serial No. 168,362.

*To all whom it may concern:*

Be it known that I, AXEL P. GUSTAFSON, a citizen of the United States of America, and a resident of Waukegan, in the county of Lake, State of Illinois, have invented certain new and useful Improvements in Molding Apparatus, of which the following is a specification.

This invention relates to molding apparatus in which a multiple series of molds are successively formed in a molding press, and stacked one upon the other for simultaneous filling with molten metal. And the present improvement has for its object:—

To provide a simple and efficient means for forming sand molds, whereby the molding sand is compressed into the mold flask in an even and uniform condition, all as will hereinafter more fully appear.

In the accompanying drawings:—

Figure 1:
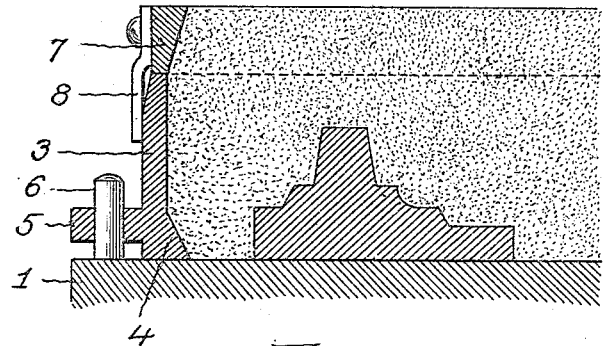
Figure 2:
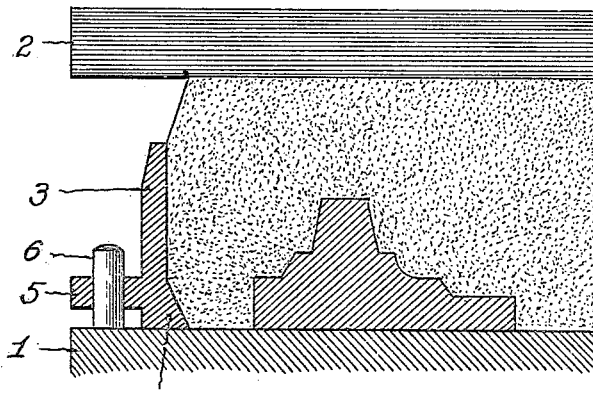
Figure 3:
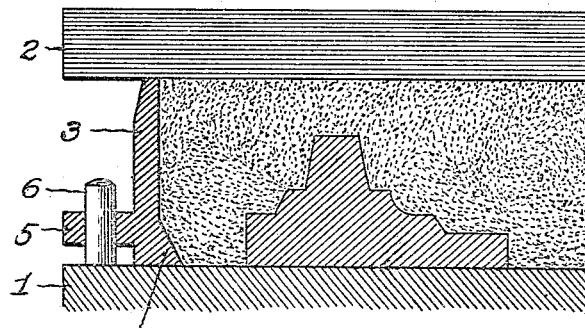

Figures 1, 2, and 3, are fragmentary vertical sections illustrating my improved molding apparatus.

Referring to the drawing, 1 designates the fixed lower platen or table of a molding press, and 2 the companion upper movable platen thereof.

3 designates a mold flask, open at top and bottom, and provided with a beveled bottom ledge, flange or rib 4 for holding the molding sand in place after compression. The mold flask 3 is provided with the usual orificed ears 5, adapted for engagement with positioning pins 6 on the fixed platen 1 to properly register the mold flask with the pattern or patterns fixed on the lower platen aforesaid, as well as to afford means for attaining accurate registry between a stack of the mold flasks.

7 designates a removable hopper frame, open at top and bottom, and having a shape corresponding to that of the mold flask 3. Said hopper has approximately the same internal dimensions and a height approximating one-third of the mold flask aforesaid. In the present structure the inner faces of the hopper frame 7 are beveled inwardly so as to taper outwardly from top to bottom in order that said frame may be readily lifted, after the molding sand has been lightly packed therein as hereinafter more fully described.

8 designates positioning prongs or the like, secured to the outer faces of the hopper frame 7 and extending below the same to have bearing first against the outer beveled upper ends and then against the faces of the mold flask 3, as shown.

In the practical operation of the present molding means, the hopper frame 7 is placed on top of the mold flask 3 as indicated in Fig. 1, after which the molding sand is sifted or otherwise introduced into the common cavity of the mold flask and hopper frame aforesaid, the surplus sand being removed by a scraper blade drawn along the top of the hopper frame 7.

The hopper frame 7 is then removed, as illustrated, in Fig. 2, leaving a mound of molding sand above the mold flask 3, with the vertical sides of said mound in an unsupported condition. The movable platen 2 of the molding machine is now caused to move downward to compress the aforesaid mound of molding sand into the interior of the mold flask 3, level with the top of said flask, as illustrated in Fig. 3.

From extended practical experience, it has been found that with the approximately vertical sides of the aforesaid mound of molding sand left in lateral unsupported condition, the action of the upper platen 2 is to pack the body of molding sand into the interior of the mold flask 3 in a uniform manner, and to a more uniform density than has been attained with the ordinary means heretofore in general use.

Having thus fully described my said invention, what I claim as new and desire to secure by Letters Patent, is:—

1. A molding apparatus comprising a platen, a mold-flask, open at top and bottom, formed with walls having outer vertical faces, provided with beveled guiding upper ends, a removable hopper frame, open at top and bottom, and positioning prongs, secured to the outer faces of the hopper frame, having offset portions extending below the same for engaging the beveled guiding upper ends of the mold-flask.

2. A molding apparatus comprising a platen, a mold-flask, open at top and bottom, formed with walls having inner vertical faces, inwardly beveled holding ledges at the bottom of the inner faces and outer vertical faces provided with beveled guiding upper ends, a removable hopper frame, open at top and bottom, formed with walls having inwardly beveled inner faces and positioning prongs, secured to the outer faces of the hopper frame, having offset portions extending below the same for engaging the beveled guiding upper ends of the mold-flask.

Signed at Waukegan, Illinois, this 7th day of May, 1917.

AXEL P. GUSTAFSON.

Copies of this patent may be obtained for five cents each, by addressing the "Commissioner of Patents, Washington, D. C."